US008848635B2

(12) United States Patent
Arvidsson et al.

(10) Patent No.: US 8,848,635 B2
(45) Date of Patent: Sep. 30, 2014

(54) SYSTEMS AND METHOD FOR COMMUNICATING PRIORITY INFORMATION FOR USE IN SCHEDULING THE TRANSMISSION OF DATA

(75) Inventors: Ake Arvidsson, Solna (SE); Tord Westholm, Vendelso (SE)

(73) Assignee: Telefonaktiebolaget L M Ericsson (publ), Stockholm (SE)

( * ) Notice: Subject to any disclaimer, the term of this patent is extended or adjusted under 35 U.S.C. 154(b) by 192 days.

(21) Appl. No.: 13/320,350

(22) PCT Filed: May 20, 2009

(86) PCT No.: PCT/IB2009/005671
§ 371 (c)(1),
(2), (4) Date: Nov. 14, 2011

(87) PCT Pub. No.: WO2010/133911
PCT Pub. Date: Nov. 25, 2010

(65) Prior Publication Data
US 2012/0063402 A1    Mar. 15, 2012

(51) Int. Cl.
*H04W 72/10* (2009.01)
*H04W 72/12* (2009.01)

(52) U.S. Cl.
CPC ................... *H04W 72/1242* (2013.01)
USPC .................. 370/329; 370/252; 370/474

(58) Field of Classification Search
USPC ............ 370/310–350, 474, 260, 466, 252; 455/13.1, 69, 23, 447, 7
See application file for complete search history.

(56) References Cited

U.S. PATENT DOCUMENTS

| 8,554,134 | B2 * | 10/2013 | So et al. ............................ 455/7 |
| 2006/0034328 | A1 * | 2/2006 | Aldermeshian et al. ...... 370/466 |
| 2006/0143444 | A1 | 6/2006 | Malkamaki et al. |
| 2007/0047478 | A1 * | 3/2007 | Balachandran et al. ...... 370/328 |
| 2007/0081603 | A1 * | 4/2007 | Jang et al. ...................... 375/260 |
| 2007/0160003 | A1 * | 7/2007 | Meier .............................. 370/329 |
| 2008/0049695 | A1 * | 2/2008 | Ogura ............................ 370/338 |
| 2009/0016267 | A1 * | 1/2009 | Otsubo et al. ................. 370/328 |
| 2009/0088195 | A1 | 4/2009 | Rosa et al. |
| 2010/0080153 | A1 * | 4/2010 | Kahn et al. .................... 370/310 |
| 2010/0284327 | A1 * | 11/2010 | Miklos .......................... 370/328 |

FOREIGN PATENT DOCUMENTS

| CN | 101395872 A | 3/2009 |
| EP | 1601145 A2 | 11/2005 |
| EP | 1708523 A1 | 10/2006 |
| EP | 1833203 A1 | 9/2007 |
| EP | 1064800 B1 | 11/2007 |

OTHER PUBLICATIONS

Search Report and English translation of First Office Action dated Nov. 7, 2013, issued in Chinese application serial No. 200980159457.4, 9 pages.

* cited by examiner

*Primary Examiner* — Charles C Jiang
*Assistant Examiner* — Mohamed Kamara
(74) *Attorney, Agent, or Firm* — Rothwell, Figg, Ernst & Manbeck, P.C.

(57) ABSTRACT

In one aspect, the invention provides apparatuses and methods for communicating, from one network node to another network node, application data together with priority information so that the receiving network node may use the priority information in scheduling the transmission of the application data to the intended receiver of the application data.

28 Claims, 9 Drawing Sheets

SYSTEMS AND METHOD FOR COMMUNICATING PRIORITY INFORMATION FOR USE IN SCHEDULING THE TRANSMISSION OF DATA

CROSS-REFERENCE TO RELATED APPLICATION

This application is a 35 U.S.C. §371 National Phase Entry Application from PCT/IB2009/005671, filed May 20, 2009, and designating the United States.

TECHNICAL FIELD

The present invention relates to the field of networking. In one aspect, the present invention relates to the system and methods for communicating priority information for use in scheduling the transmission of data.

BACKGROUND

Typically, a telecommunication network is shared by many users. The resources of the network (e.g., cell number/size, transmission bandwidth and routing/switching capacity) are engineered to handle a given demand with a given quality of service. The given demand is typically based on an "average user," the behaviour of which is constructed from a mix of assumptions and measurements. Many tariffs (e.g., flat rates) are set to match the resources consumed by the average user.

The statistical methods used for dimensioning networks and setting tariffs work well as long as user behaviour is relatively homogeneous. If this is not the case, then the result may be congested networks with poor performance and unbalanced tariffs where less active users in effect subsidise more active users.

Several measurements have shown that the degree of activity varies considerably between different users. In more detail, the vast majority of users exhibit low or medium activity while a small number of users exhibit high or extreme activity. The users exhibiting high or extreme activity (a.k.a., "heavy hitters") pose a potential problem to network operators because such users tend to offset the dimensioning model by flooding the network and creating traffic peaks at the expense of the other users. In addition to the notion of "heavy hitters," there is the notion of "bad applications," which (at present) typically include file sharing applications that use peer-to-peer protocols. The term "heavy hitter" is often used in this context as well.

The root of the problem presented by "heavy hitters" is the flat rate tariff scheme. An obvious solution is thus to charge each user by the amount of network traffic the user generates, in the same way as telephone use is charged by time. The problem with this solution, however, is that traffic volumes are hard to understand for ordinary users. Hence, the result is an uncertainty about costs which results in ordinary users tending to refrain from using the service at all.

Another option is to impose some sort of upper limit on traffic volumes. Such a limit can easily be chosen such that most ordinary users never will hit this limit. The issue with this scheme is what to do with the users that do hit the limit. One option is to make contact with such users, discuss their usage and offer different upgrades to their subscriptions. A difficulty with this approach, besides the fact that it requires manual intervention, is that users may perceive such contacts as a threat to their privacy. A non-manual option is to simply reject excess volumes, but this solution would most likely be perceived as too hostile to customers. A more advanced non-manual option is to automatically apply additional charges for excess volumes, but this solution leads back to the uncertainty problem which the flat rate scheme originally was devised to avoid.

What is desired are systems and methods for overcoming at least some of the above described problems.

SUMMARY

In one aspect, the invention overcomes at least some of the above described problems by providing a means to support traffic discrimination so that, for example, "heavy hitter" application data (e.g. traffic to or from a user that has exceeded a traffic threshold) can be treated differently than other application data. In some embodiments, this is accomplished by communicating, from one network node to another network node, application data together with priority information so that the receiving network node may use the priority information in scheduling the transmission of the application data to the intended receiver of the application data. That is, the receiving network node (e.g., a base station) can use the priority information, for example, to discriminate (i.e., treat differently) application data that has a high priority (e.g., voice traffic) from application data that has a lower priority, such as application data transmitted to or from a user that has exceeded a monthly (or daily, weekly, etc.) traffic threshold (i.e. a user that has an "empty bucket"), thereby providing high priority application data with a better quality of service (QoS) than lower priority application data. The priority information may be information that identifies a user's subscription class (e.g., gold, silver or bronze), account status (e.g., non-empty bucket or empty bucket), and application characteristics (e.g., internet access or premium service). Thus, an aspect of the invention provides the advantage of enabling detailed discrimination in QoS based on subscription class, account status and application characteristics. An additional advantage is that the invention may be used to impose minimal, but efficient, restrictions on users who have "empty buckets" (typically these users are the heavy hitters) or chosen low cost subscriptions. It is thus also possible to allow users to choose from a range of subscription classes.

Embodiments of the invention can be implemented within existing standards and requires a minimum of implementation effort. This is because these embodiments may use a generally accepted per-hop behavior (PHB) mechanism, which already is supported by most vendors of intermediate nodes (e.g., routers), but can be implemented entirely in a support node (e.g., a gateway GPRS support node (GGSN)) or base station (e.g., Node B). Additionally, embodiments of the invention work with all existing user terminals and implements the discrimination throughout the network by means of PHBs in intermediate nodes of any brand.

For example, in one aspect, the invention provides a method for communicating to a network node (e.g., base station) priority information that can be used by the network node to schedule the transmission of downlink application data to a user equipment (UE). The method may be performed by an edge router or edge gateway. In some embodiments, the method includes the following steps: (a) receiving a first packet containing application data intended for the UE, (b) determining the priority of the application data, (c) creating a second packet comprising a header and payload that includes at least some of the application data, and (d) transmitting the second packet towards the network node. Advantageously, the step of creating the second packet comprises including in the header of the second packet priority information identifying the priority determined in step (b). Also, the second packet is transmitted such that the network node receives at least some of the application data and the priority information.

In some embodiments, the method also includes the steps of: (e) creating a third packet comprising a header and payload, the payload of the third packet comprising the second packet. The third packet may be an Internet Protocol packet and the header of the second packet may be a user datagram protocol (UDP) that includes a port number field, a transmission control protocol (TCP) header that includes a port number field, or a tunneling protocol header that includes a tunnel endpoint identifier (TEID) field. The step of including in the header of the second packet the priority information may include placing at least some of the priority information in a port number field of the header of the second packet or a TEID field of the header of the second packet, and the step of transmitting the second packet towards the network node consists of transmitting the third packet towards the network node.

In some embodiments, the second packet is an Internet Protocol packet and the header includes a Differentiated Services (DS) field or Type of Service (TOS) field, and the step of including in the header the priority information comprises placing at least some of the priority information in the DS or TOS field of the header.

In other embodiments, the second packet is an ATM cell and the header includes a virtual path identifier (VPI) field and a virtual channel identifier (VCI) field, and the step of including in the header the priority information comprises placing at least some of the priority information in the VPI and/or VCI field.

In some embodiments, the first packet includes a header containing a destination address, and the step of determining the priority of the application data comprises determining the destination address included in the header of the first packet and using the destination address to obtain policy information that includes the priority information or information from which the priority information can be derived. In some embodiments, the step of using the destination address to obtain the policy information comprises transmitting to a policy server a request for the policy information, wherein the request includes the destination address. The policy information may indicate the state of a usage metric associated with the UE.

In some embodiments, the step of determining the priority of the application data comprises (a) determining the application executing in the UE that is the intended recipient of the application data contained in the first packet and/or (b) inspecting the payload of at least the first packet to determine the type of content contained in the payload.

In another aspect, the invention provides an improved apparatus (e.g., edge gateway apparatus). In some embodiments, the improved edge gateway apparatus includes: a data storage system storing computer software, a data processing system for executing the computer software; and a transmit and receive module operable to receive a first packet containing application data destined for a user equipment (UE). The computer software is configured such that when the computer software is executed by the data processing system the data processing system, in response to receiving the first packet, performs a process comprising the following steps: (a) determining the priority of the application data, (b) creating a second packet comprising a header and a payload containing at least some of the application data, and (c) transmitting the second packet towards a network node. The step of creating the second packet may comprise including in the header of the second packet priority information identifying the priority determined in step (a). The second packet is transmitted such that the network node receives the at least some of the application data and the priority information.

In another aspect, the present invention provides a method for communicating to a network node priority information that can be used by the network node to prioritize the transmission of a packet. The method may be performed by a base station operable to communicate wirelessly with a UE. In some embodiments, the method begins with the base station receiving a first packet comprising a header and payload. The payload contains downlink application data intended for the UE, and the header contains priority information. Next, after receiving the first packet, the base station receives from the UE uplink application data. Next, after receiving the uplink application data, the base station creates a second packet comprising a header and payload. The step of creating the second packet comprises including in the header of the second packet the priority information that was included in the header of the first packet, or bits derived from the priority information. It may also comprise including in the payload of the second packet at least some of the uplink application data. Next, the base station transmits the second packet towards the network node. The base station may be configured to schedule the transmission of the downlink application data to the UE based, at least in part, on the priority information included in the header of the first packet. Also, the base station may be configured to schedule an uplink transmission from the UE based, at least in part, on the priority information.

In some embodiments, the second packet is an Internet Protocol packet and the header of the second packet includes a Differentiated Services (DS) field or Type of Service (TOS) field, and the step of including in the header of the second packet the priority information or the bits derived from the priority information comprises placing the priority information or the bits in the DS or TOS field of the header of the second packet.

In some embodiments, the first packet is a UDP/IP or TCP/IP packet and the header of the first packet includes a port number field, and at least some of the priority information is contained in the port number field. In other embodiments, the first packet is a tunneling protocol packet and the header of the first packet includes a tunnel end point identification (TEPI) field, and at least some of the priority information is contained in the TEPI field.

In some embodiments, the step of creating the second packet includes (a) determining whether the uplink application data is addressed to the same application end point that originated the downlink application data and (b) including in the header of the second packet the priority information that was included in the header of the first packet or bits derived from the priority information in response to determining that the uplink application data is addressed to the same application end point that originated the downlink application data.

In another aspect, the present invention provides an improved base station. In some embodiments, the improved bases station includes a data storage system storing computer software, a data processing system for executing the computer software, and a transmit and receive module operable to receive a packet comprising a header that contains priority information and a payload that contains downlink application data intended for a particular user equipment (UE). The computer software is configured such that, when the computer software is executed by the data processing system, the data processing system, in response to receiving the packet, performs a process comprising the following steps: (a) after receiving the packet, receiving from the particular UE uplink application data, (b) after receiving the uplink application data, creating a second packet comprising a header and a payload that contains at least some of the uplink application data, and (c) transmitting the second packet towards the network node. The step of creating the second packet includes including in the header of the second packet the priority information that was included in the header of the received packet or bits derived from the priority information.

The above and other aspects and embodiments are described below with reference to the accompanying drawings.

BRIEF DESCRIPTION OF THE DRAWINGS

The accompanying drawings, which are incorporated herein and form part of the specification, illustrate various embodiments of the present invention and, together with the description, further serve to explain the principles of the invention and to enable a person skilled in the pertinent art to make and use the invention. In the drawings, like reference numbers indicate identical or functionally similar elements.

DETAILED DESCRIPTION

Figure 1:
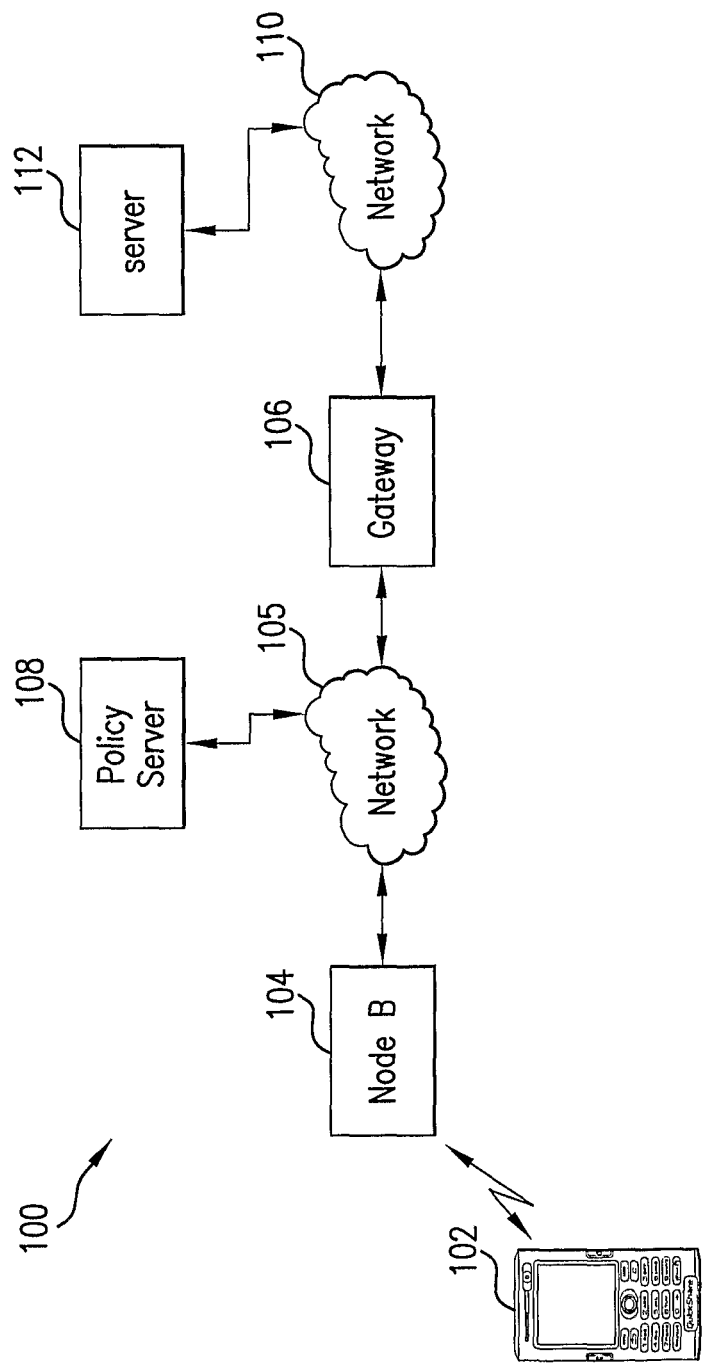
FIG. 1 illustrates a system according to an embodiment of the invention.
Figure 2:
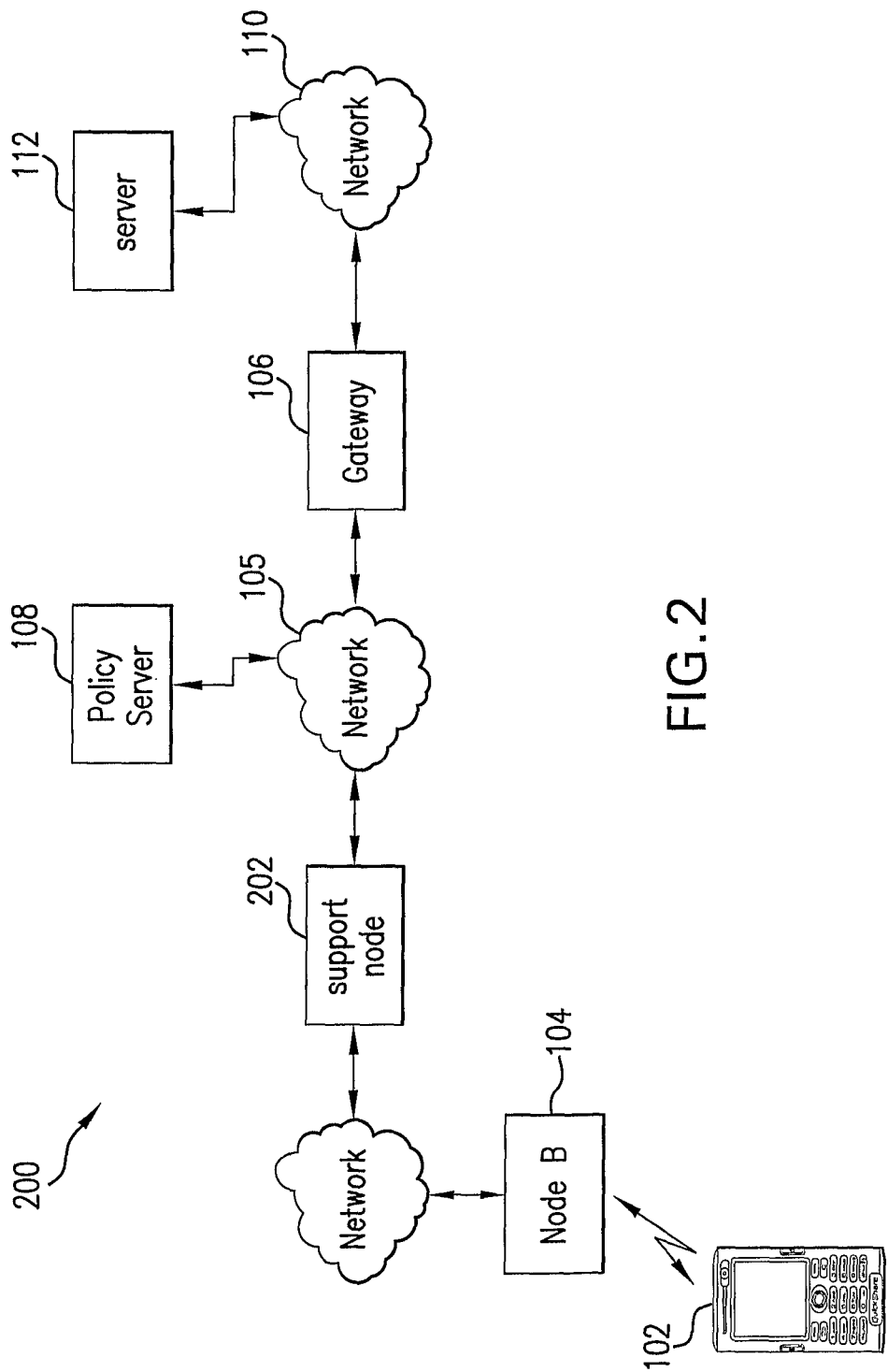
FIG. 2 illustrates a system according to an embodiment of the invention.

Referring now to FIG. 1, FIG. 1 illustrates a communication system 100 according to an embodiment of the invention. As shown in FIG. 1, system 100 includes a user equipment 102 (e.g., mobile phone or other user terminal) that may communicate with a server 112 (e.g., web server or other server) via a base station 104 (a.k.a., Node B in some environments) and a gateway 106 (e.g., a Gateway GPRS Support Node (GGSN) or other edge router/gateway, such as a public data network gateway (PDN-GW)). Referring to FIG. 2, FIG. 2 illustrates a communication system 200 according to another embodiment of the invention. System 200 is the same as system 100 with the exception that the base station 104 and gateway 106 communicates via one or more support nodes 202 (e.g., Serving GPRS Support Node (SGSN) or other node, such as a Serving Gateway (SGW)).

In systems 100 and 200, gateway 106 functions to (1) receive from server 112 application data that is intended for UE 102; (2) determine a priority to assign to the application data; and (3) forward to base station 104 the application data and priority information identifying the priority. The priority information, in addition to identifying the priority may include instructions or commands for the base station 104 to execute as well as default values. Base station 104, in response to receiving the application data and priority information may schedule the wireless transmission of the application data to UE 102 based on, at least in part, the received priority information. Advantageously, in this manner, the base station can discriminate application data that has a high priority (e.g., voice traffic) from application data that has a lower priority (e.g., application data transmitted from a user that has exceeded a monthly, daily, weekly, etc., traffic threshold (i.e., the user has an "empty bucket"), thereby providing high priority application data with a better quality of service (QoS) than lower priority application data.

Figure 3:
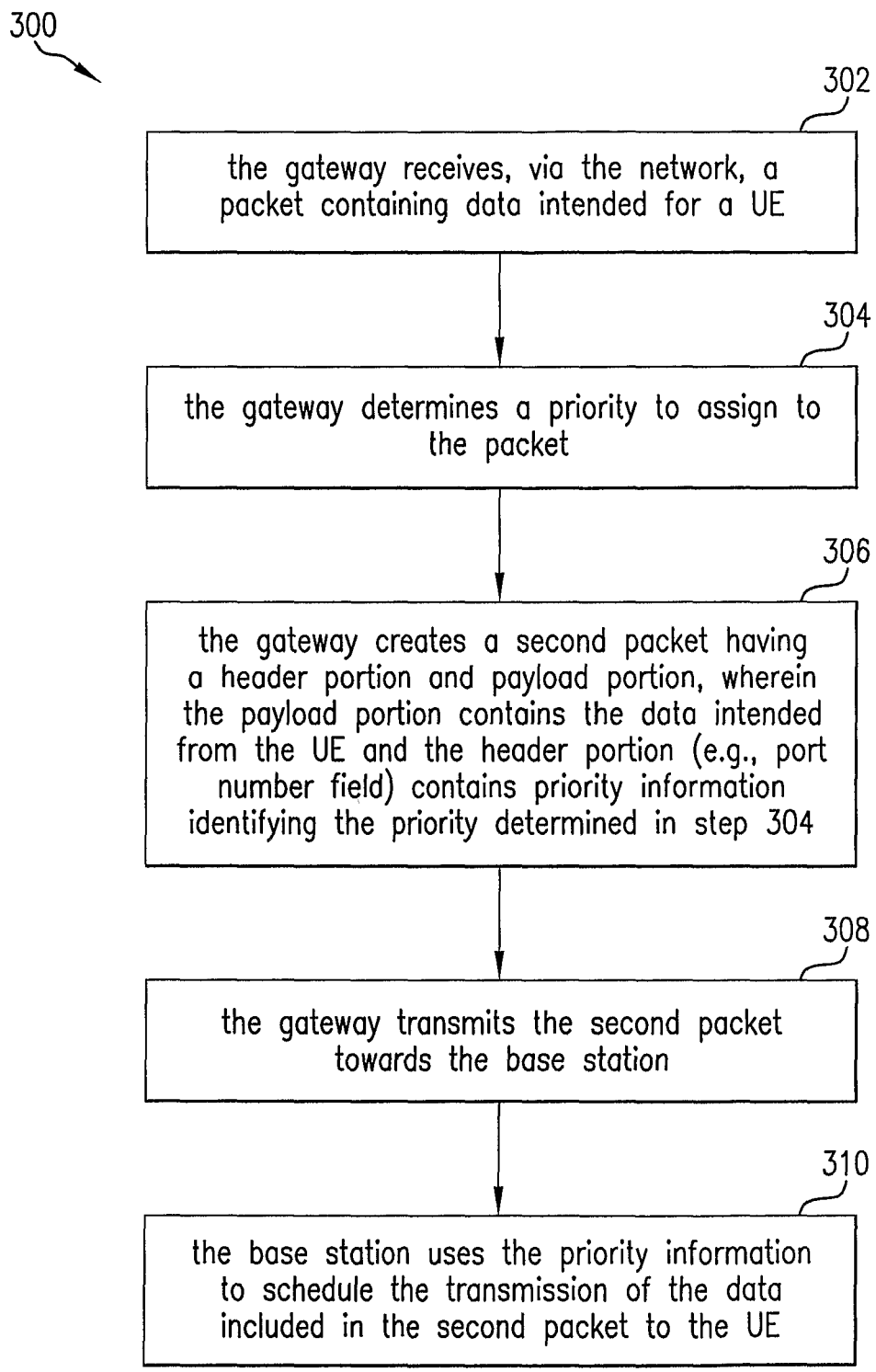
FIG. 3 is a flow chart illustrating a process according to some embodiments of the invention.
Figure 4:
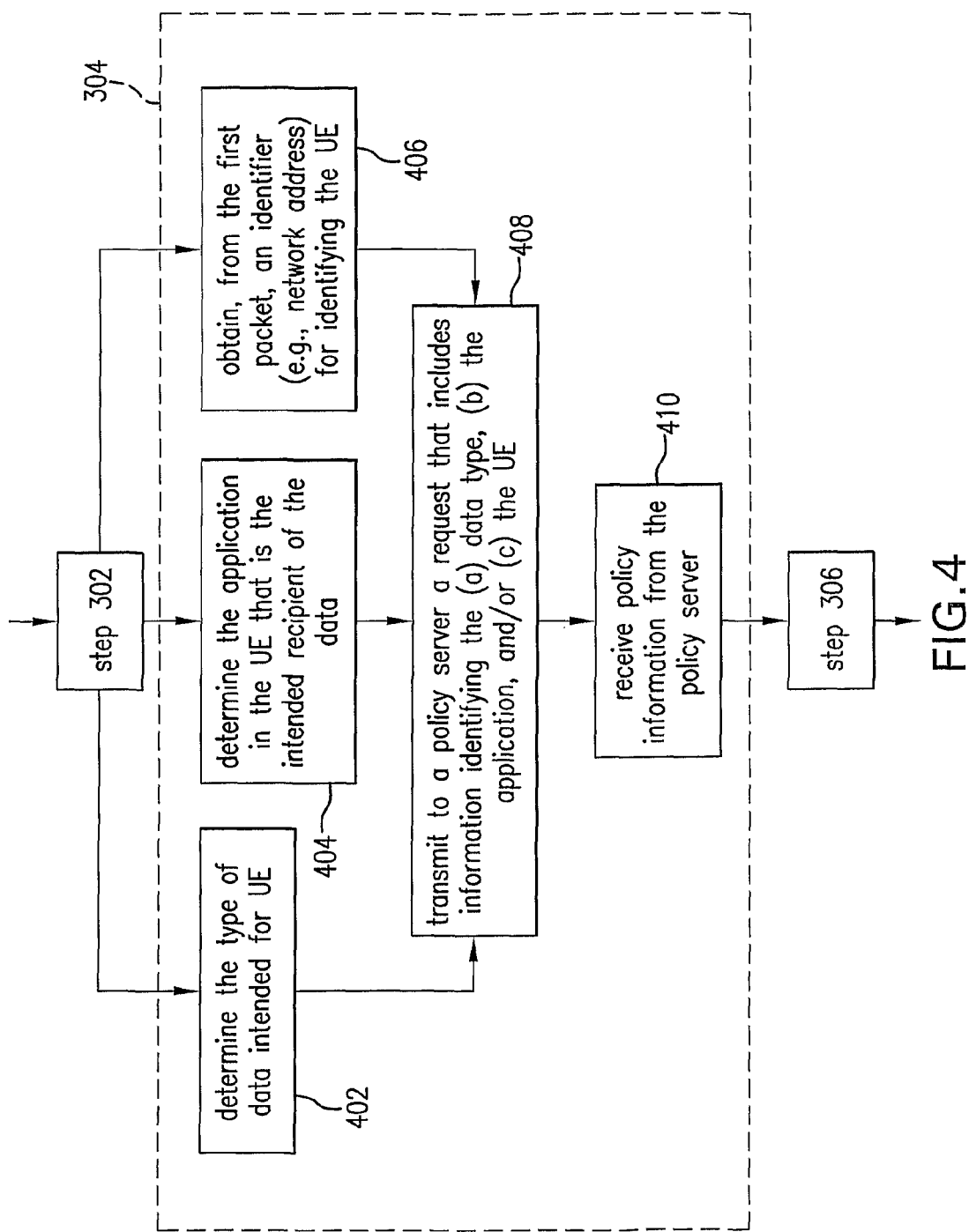
FIG. 4 is a flow chart illustrating a process according to some embodiments of the invention.

The above described process is further illustrated in the flow chart shown in FIG. 3. Referring now to FIG. 3, FIG. 3 illustrates a process 300, according to an embodiment of the invention, for communicating priority information from one network node (e.g., gateway 106) to another network node (e.g., base station 104). Process 300 may begin in step 302, where gateway 106 receives, via network 110, a protocol data unit 801 (hereafter referred to as a "packet") (see FIG. 8, which shows a message flow diagram according to an embodiment of the invention) containing application data AD1 intended for UE 102. For example, packet 801 may have been transmitted by server 112 or another device connected to network 110. In the example illustrated, packet 801 is a TCP/IP packet (although packet 801 could also be a UDP/IP packet or other type of packet). More specifically, because packet 801 in this example is a TCP/IP packet, packet 801 includes TCP/IP headers and application data AD1. In step 302, gateway 106 determines a priority to assign to packet 801. There are a number of ways gateway 106 can make this determination, some of which are illustrated in FIG. 4.

Figure 8:
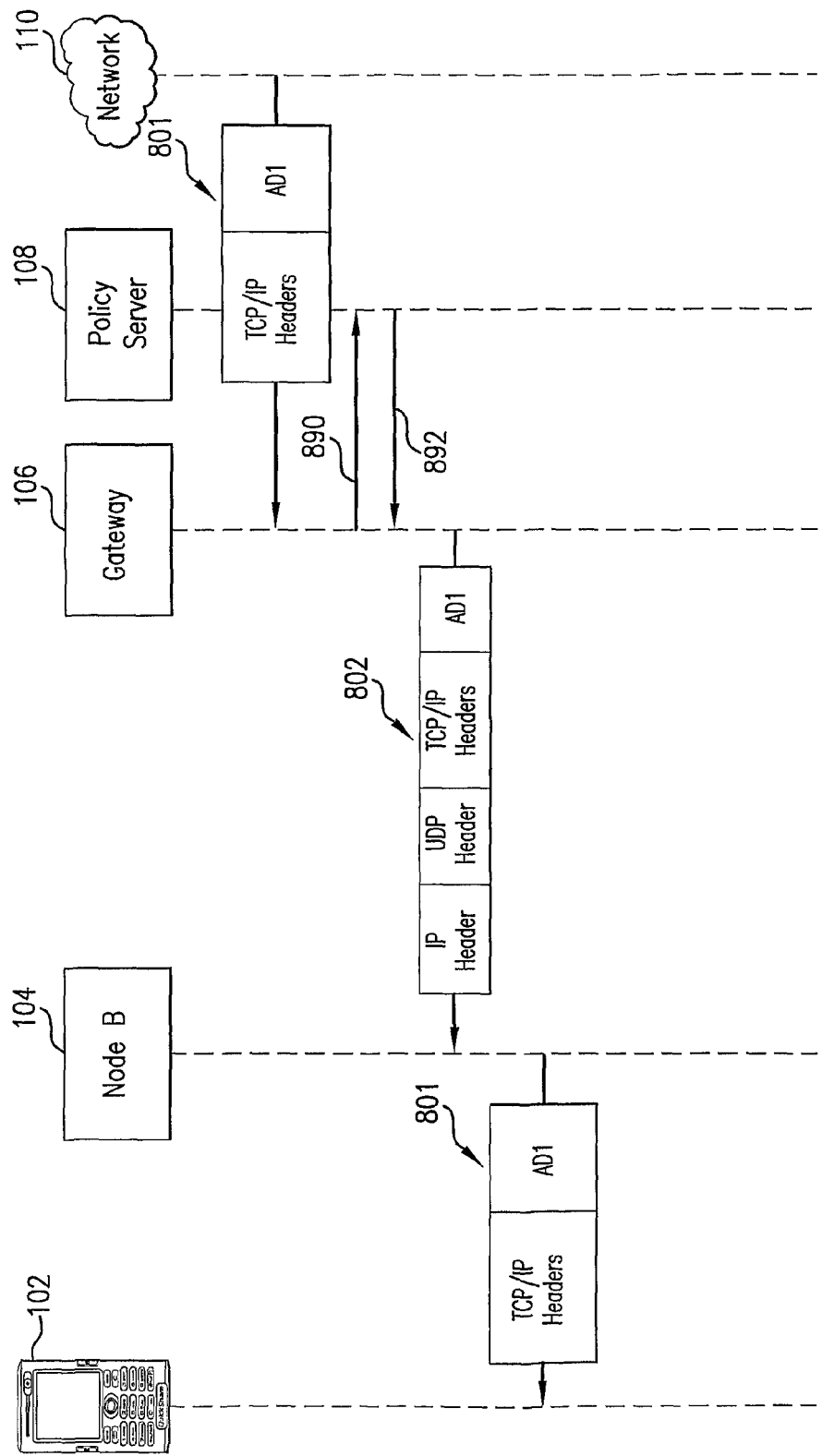
FIG. 8 is a message flow diagram according to some embodiments of the invention.

In step 306, gateway 106 creates a packet 802 (see FIG. 8). Packet 802 has a header portion containing one or more headers and a payload portion. In the example shown, the header portion includes an Internet Protocol (IP) header and a user datagram protocol (UDP) header, but in other embodiments the header portion may include transmission control protocol (TCP) header in place of the UDP header. In some embodiments, the header portion may further include a General Packet Radio Service (GPRS) Tunneling Protocol (GTP) header. In still other embodiments, the header portion may include a different set of one or more headers (e.g., ATM headers if the network 105 between gateway 106 and base station 104 is an ATM network or a TCP header instead of the UDP header, as mentioned above). The payload portion of packet 802 contains application data AD1 that was included in packet 801. In some embodiments, the payload portion of packet 802 may contain the entire packet 801, rather than just the application data AD1.

Advantageously, gateway 106 includes in the header portion of packet 802 priority information corresponding to the priority determined in step 304. In embodiments where a header (e.g., UDP or TCP header) included in packet 802 includes a port field (e.g., destination port or source port), gateway 106 may include at least some of the priority information in the port field (i.e., may use the port field to encode at least some of the priority information). In embodiments where packet 802 includes an IP header, gateway 106 may include priority information in a Differentiated Services (DS) field or Type of Service (TOS) field of the IP packet. As one example, the priority information may be a 6-bit value that is stored in the DS field in the same way that a Differentiated Services Codepoint (DSCP) value is stored in the DS field. In embodiments, where a header included in packet 802 in an ATM header, gateway 106 may include at least some of the priority information in a virtual path identifier (VPI) and/or virtual channel identifier (VCI) field of the header. Additionally, in such embodiments, if packet 801 includes PHB data, gateway 106 may translate this data to an ATM QoS setting by, for example, using a look-up table or other data translation mechanism. In embodiments where packet 802 is an AAL2 packet, gateway 106 may include at least some of the priority information in a channel identifier (CID) field of the header.

In step 308, gateway 106 transmits packet 802 towards base station 104 such that base station 104 receives the priority information and application data AD1. For example, in the embodiment shown in FIG. 1, gateway 106 addresses packet 802 to base station 104 (e.g., the destination address field in the IP header of packet 802 contains the IP address of base station 104) and transmits packet 802 so that it is received by base station 104 via network 105, which may include one or more intermediate nodes (e.g., IP routers). In the embodiment shown in FIG. 2, gateway 106 addresses packet 802 to support node 202 and transmits packet 802 so that it is received by support node 202. Support node 202, in response to receiving packet 802, may (1) create a new packet (e.g., UDP/IP packet, TCP/IP packet, ATM cell, or other packet) that includes a header and payload, where the header of the new packet contains the priority information (or a translated version thereof) that was contained in a header of packet 802 and the payload of the new packet contains packet 801 (or at least some of the application data AD1), (2) address the new packet to base station 104, and (3) transmit the new packet so that the new packet is received by base station 104. In the embodiment where the new packet created by node 202 is a UDP/IP or TCP/IP packet, the priority information may be encoded in a port field of the packet. Similarly, if the new packet created by node 202 is an ATM cell, the priority information may be encoded in a VPI, VCI, and/or CID field of the packet. In any of the above scenarios, base station 104 receives the priority information (or translated version thereof) and application data AD1.

In step 310, base station 104, in response to receiving packet 802 (or the packet transmitted from support node 202, as described above), schedules the transmission of packet 801 (or at least the application data AD1) based on, at least in part, the priority information contained in the header of the received packet (i.e., packet 802 or the packet received from the support node). In this manner, base station 104 can discriminate application data that has a high priority (e.g., voice traffic) from application data that has a lower priority. That is, for example, if base station 104 receives high priority application data, base station may schedule the transmission of this data so that this data is transmitted before low priority data that is waiting to be transmitted.

While process 300 was described above using the example where gateway 106 determines the priority information, the invention is not limited to this scenario as any network node could implement steps 302-308.

Referring now to FIG. 4, FIG. 4 is a flow chart illustrating various ways in which gateway 106 may implement step 304 of process 300 (i.e., determine what priority to assign to packet 801). As illustrated in FIG. 4, gateway 106 may perform one or more of steps 402, 404 and 406.

In step 402, gateway 106 determines the type of application data that is contained in packet 801. Gateway 106 may accomplish this by using a well known technique known as deep packet inspection (DPI). That is, for example, gateway 106 may determine the type of the application data by (a) inspecting one or more headers or application data included in packet 801 as well as possibly (b) inspecting one or more headers of or application data from one or more other packets destined for UE 102. In step 404, gateway 106 determines the application in UE 102 that is the intended recipient of application data AD1. Gateway 106 may accomplish this by DPI. In step 406, gateway 106 obtains from packet 801 an identifier (e.g., network address) for identifying UE 102.

In step 408, gateway 106 transmits to a server 108 (a.k.a., "policy server 108") a request 890 (see FIG. 8) that includes (a) information identifying the data type determined in step 402, (b) information identifying the application determined in step 404 and/or (c) information identifying UE 102.

In step 410, gateway 106 receives from server 108 a response 892 to the request transmitted in step 408. The response may include the priority information or information from which the priority information can be derived. For example, the information returned from server 108 may inform gateway 106 as to the state of a usage metric (a.k.a., "bucket") associated with UE 102 (e.g., information indicating whether a traffic counter value associated with UE 102 exceeds a threshold). For instance, if the information returned indicates that the state of the bucket is empty (e.g., the traffic counter value exceeds the threshold), then gateway 106 will assign a low priority to application data AD1. Additionally or alternatively, the information returned from server 108 can identify the subscription class of the user of UE 102, and the priority assigned to application data AD1 by gateway 106 may be dependent upon the subscription class. For instance, if application data is intended for a user having a "gold" subscription class, then the assigned priority should be higher than a priority assigned to data intended for a different user having a lesser subscription class (e.g., "bronze"). In this manner, base station 104 may discriminate based on not only account status, data type, and application destination (to name a few), but also subscription class because the priority assigned by gateway 106 will be reflected in the priority information transmitted with the application data by gateway 106 towards base station 104.

Figure 5:
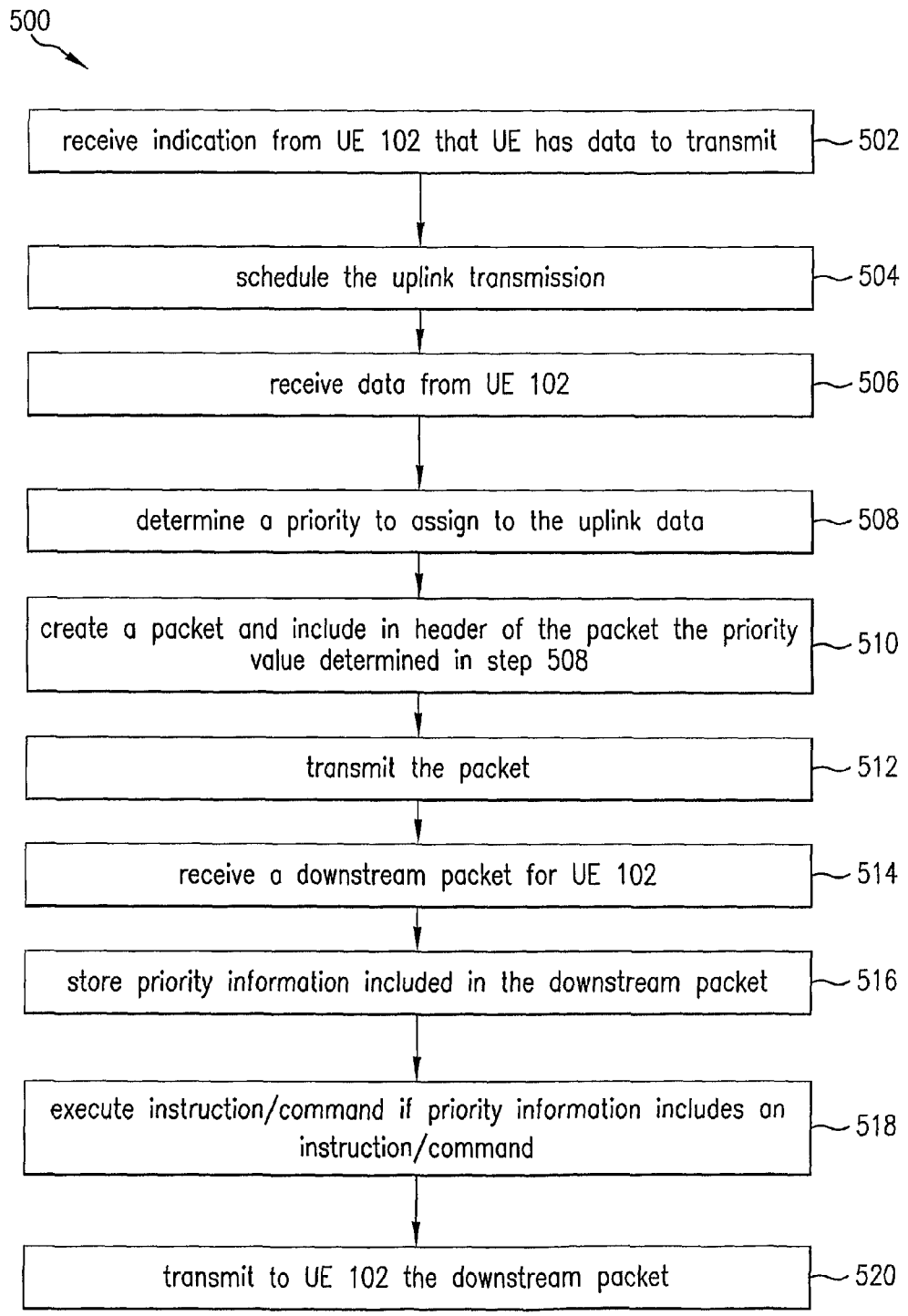
FIG. 5 is a flow chart illustrating a process according to some embodiments of the invention.
Figure 9:
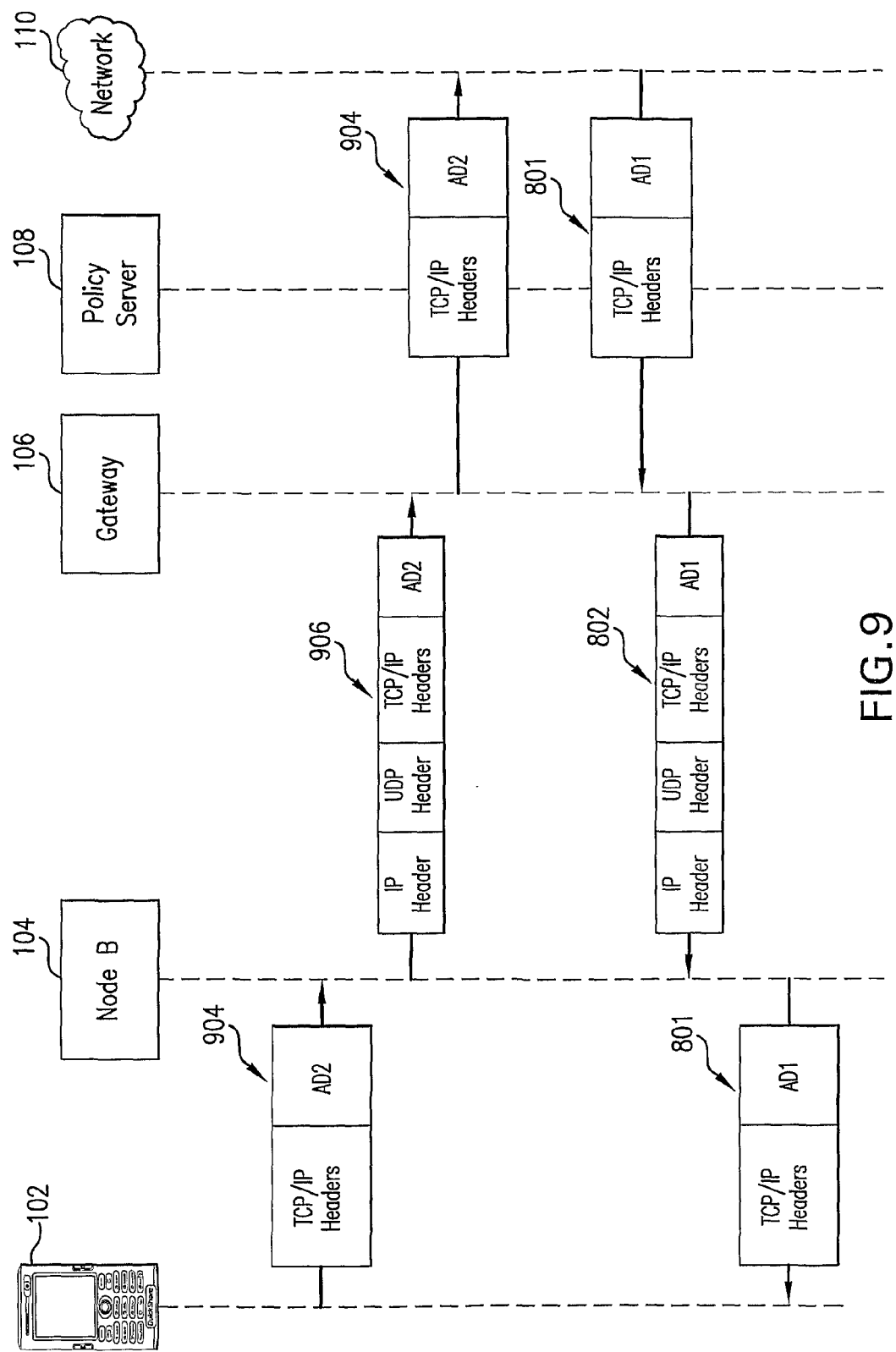
FIG. 9 is a message flow diagram according to some embodiments of the invention.

Referring now to FIGS. 5 and 9, FIG. 5 illustrates a process 500 for communicating priority information, according to an embodiment of the invention. In the example below, process 500 is performed by base station 104. Process 500 may begin in step 502, where base station 104 determines that it should schedule an uplink transmission for UE 102. For example, base station 104 may receive an indication that UE 102 may have uplink data to transmit to base station 102 over the air interface. For instance, we shall assume for the sake of simplicity that UE 102 signals base station 104 that it has a packet (e.g. packet 904—see FIG. 9) to transmit to base station 104. In step 504, base station 104 schedules the radio transmission of packet 904 (step 504). As shown in FIG. 9, packet 904 may contain application data AD2, which, in this example, we shall assume is intended for a host 112 on network 110.

The scheduling may be based on (1) an assumed priority of the uplink data, which we refer to as "speculative scheduling" or (2) based on a default priority value. The default priority value may be a general default priority value that applies to all UEs or it may be a UE specific default priority value. In the case where base station 104 schedules the uplink transmission based on a default priority value, the default value that is chosen may be controlled by commands included in priority information communicated to base station 104 by gateway 106, as described above. For example, gateway 106 may set the default value for a user may based on whether the user has exceeded a transmission quota (i.e. a bucket associated with the user is empty). That is, the gateway 106 may set the default value to a "low priority" value if the user has an empty bucket, otherwise, for example, it may set the default value to "normal."

In the case where base station 104 schedules the uplink transmission of packet 904 based on a determined assumed priority value, there are many algorithms base station 104 can use to determine the assumed priority of packet 904. For example, if UE 102 has only one flow in progress, then base station 104 can assume that the priority of packet 904 is equal to the priority assigned to a recently received downlink packet (e.g., packet 802) destined for UE 102 or an uplink packet recently received from UE 102. If there are no such downlink or uplink packets, then base station 104 can resort to using a default value as described above. As another example, if UE 102 has multiple flows in progress, but each flow has the same priority, then base station 104 can assume that the priority of packet 904 is equal to the priority assigned to any recently received downlink packet (e.g., packet 802) destined for UE 102 or any uplink packet recently received from UE 102. Again, if there are no such downlink or uplink packets, then base station 104 can resort to using a default value as described above. As yet another example, base station 104 can determined the assumed priority level by utilizing the priority levels from an arbitrary number of "recent" uplink and/or downlink packets (e.g. the N previous packets) from/for UE 102 and compute or select a priority level. For instance, base station 104 could select the minimum (or maximum) priority level from the N previous packets. Alternatively, base station 104 could compute the average or weighted aver priority level of the N previous packets or perform a more advanced statistical analysis.

In step 506, after scheduling the uplink transmission, base station 104 receives at least the first few bytes of packet 904.

Next (step 508), base station 104 may use the received bytes to determine a priority to assign to packet 904. For example, if the bytes received contain enough information for base station 104 to determine the flow to which packet 904 belongs, then base station 104 could use the flow information to determine the priority level of a recently received downstream packet (e.g. packet 802) that belongs to the same flow and use that priority level to assign a priority level to packet 904 (e.g. the priority level assigned to packet 904 may be set equal to the priority level of the recently received downstream packet or may be derived from the priority level of the recently received downstream packet). In some embodiments, base station 104 may determine the flow to which packet 904 belongs by examining five pieces of information from packet 904 (i.e. a "five-tuple"). In the case where packet 904 is a TCP/IP packet or UDP/IP packet, this five-tuple may consist of: the source address stored in the IP header of packet 904, the destination address stored in the IP header of packet 904, a source port number stored in the UDP/TCP header of packet 904, a destination port number stored in the UDP/TCP header of packet 904, and a protocol identifier stored in the IP header of packet 904.

If base station 104 is able to determine the flow to which packet 904 belongs, but has not received any downstream packets for that flow (e.g., packet 904 initiates the flow), then base station 104 may determine the priority to assign to packet 904 using any of the techniques described above with respect to step 504. That is, base station 104 may determine the priority to assign to packet 904 by utilizing the priority levels from an arbitrary number of "recent" uplink and/or downlink packets (e.g. the N previous packets) from/for UE 102 and compute or select a priority level. For instance, base station 104 could select the minimum (or maximum) priority level from the N previous packets. Alternatively, base station 104 could compute the average or weighted aver priority level of the N previous packets or perform a more advanced statistical analysis. As another alternative (e.g. there are no such previous packets), base station 104 could use assign a default priority value to packet 904 as described above.

Next (step 510), base station 104 creates a packet 906 (e.g., UDP/IP or TCI/IP packet or ATM packet) having a header portion and a payload portion, and includes the priority value determined in step 508 in the header portion of packet 906. The payload portion of packet 906 may contain the packet 904 (or portion thereof). As a specific example, the header portion of packet 906 may include an IP header having a Differentiated Services (DS) field or Type of Service (TOS) field, and base station 104 may store the priority information determined in step 508 in the DS or TOS field (this is done so that standard intermediate nodes will support the discrimination mechanism). The priority information may be a 6-bit value that is stored in the DS field in the same way that a Differentiated Services Codepoint (DSCP) value is stored in the DS field.

Next (step 512), base station 104 transmits packet 906 towards the host so that the host will receive application data AD2. In this manner, base station 104 can assign upstream priority information to application data AD2.

Next (step 514), receives downstream packet 802 (or a packet translated from packet 802 as described above).

Next (step 516), base station 104 stores at least some of the priority information contained in packet 802 (i.e., the downstream priority information) such that the downstream priority information is associated with UE 102. For example, the downstream priority information may be stored such that it is linked with the destination address stored in the IP header of packet 802. As another example, the priority information may also be stored such that it is linked with a stored five-tuple. The five-tuple may consist of the source address stored in the IP header of packet 802, the destination address stored in the IP header of packet 802, a source port number stored in the UDP header of packet 802, a destination port number stored in the UDP header of packet 802, and a protocol identifier stored in the IP header of packet 802. Base station 104 performs step 516 to facilitate steps 504 and 508.

That is, for example, when performing step 508, base station 104 may compare a five-tuple from packet 904 with a stored five-tuple to determine if there is a match. If there is a match, then base station 104 may retrieve the priority information that is linked with the matching stored five-tuple and, as described above, use the retrieved priority information to determine the priority to assign to packet 904. If the five-tuple from packet 904 does not match any stored five-tuple (this could happen when packet 904 is the packet that initiates a flow), then base station 104, as described above, may perform step 508 by using the source address from packet 904 to retrieve the stored downstream priority information from an arbitrary number of recent uplink and/or downlink packets from/for UE 102 and use this retrieved information to determine the priority to assign to packet 904.

Next (step 518), if the priority information contained in packet 802 includes an instruction or command, base station 104 executes the instruction or command. As an example, the instruction or command may cause the base station 104 to replace a previously designated default priority value with a new default priority value that is included in the priority information.

Next (step 520), base station 104 transmits to UE 102 the application data contained in the received packet. After step 520, process 500 may proceed back to step 502.

Figure 6:
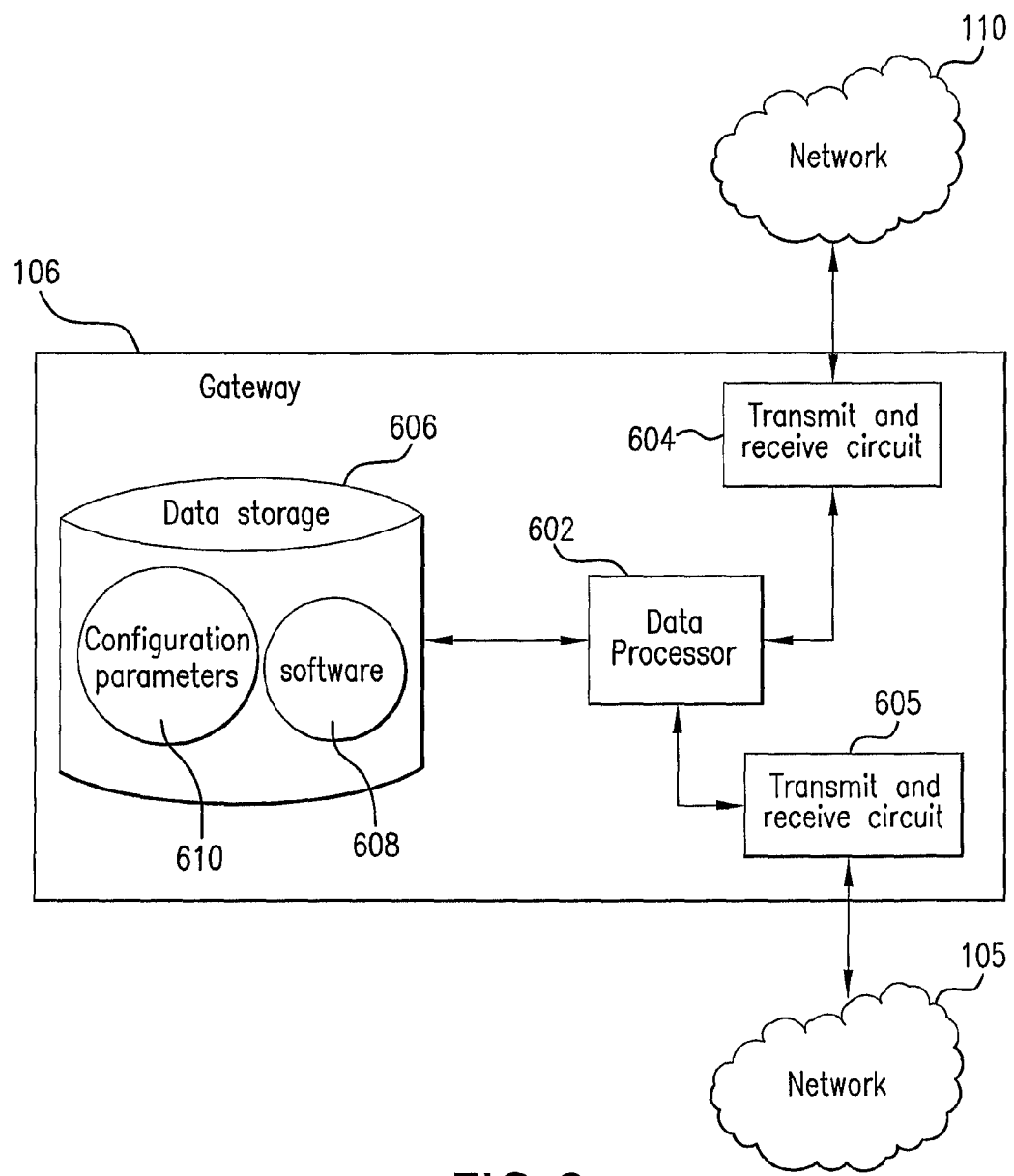
FIG. 6 is a functional block diagram of a gateway according to some embodiments of the invention.

Referring now to FIG. 6, FIG. 6 is a functional block diagram of gateway 106 according to some embodiments of the invention. As shown, gateway 106 may comprise a data processing system 602 (e.g. one or more microprocessors, one or more integrated circuits, such as an application specific integrated circuit (ASIC), Field-programmable gate arrays (FPGAs), etc. and any combination of these), a data storage system 606 (e.g., one or more non-volatile storage devices) and computer software 608 stored on the storage system 606.

Configuration parameters 610 may also be stored in storage system 606. Gateway 106 also includes transmit/receive (Tx/Rx) circuitry 604 for transmitting data to and receiving data from network 110 and transmit/receive (Tx/Rx) circuitry 605 for transmitting data to and receiving data from, for example, network 105. Software 608 is configured such that when processor 602 executes software 608, gateway 106 performs steps described above with reference to the flow charts shown in FIGS. 3-4. In other embodiments, data processing system 602 is configured to perform steps described above with reference to the flow charts shown in FIGS. 3-4 without the need for software 608. That is, for example, data processing system may consist merely of one or more ASICs. Hence, the features of the present invention described above may be implemented in hardware and/or software.

Figure 7:
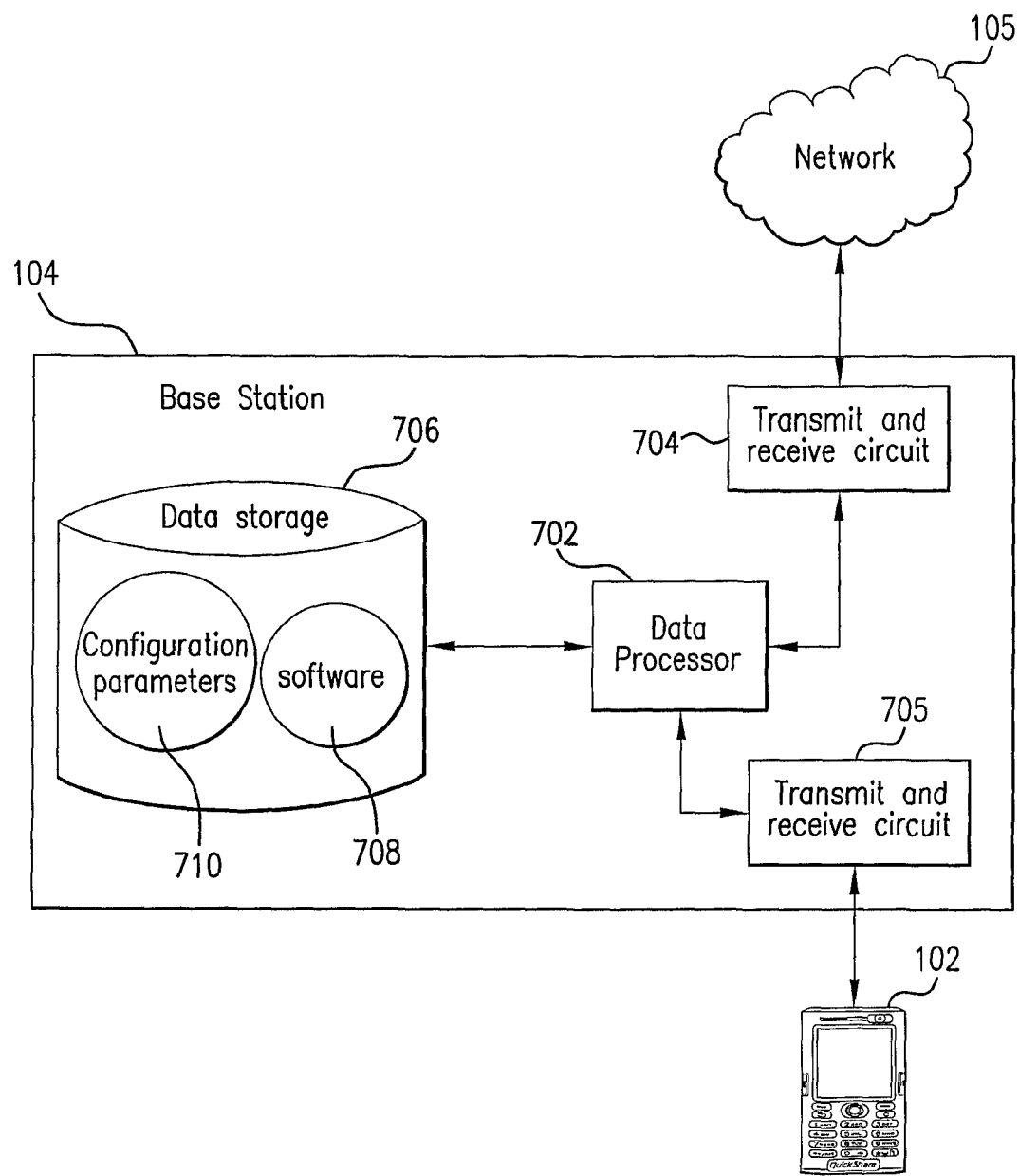
FIG. 7 is a functional block diagram of a gateway according to some embodiments of the invention.

Referring now to FIG. 7, FIG. 7 is a functional block diagram of base station 104 according to some embodiments of the invention. As shown, base station 104 may comprise a data processing system 702 (e.g. one or more microprocessors, one or more integrated circuits, such as an application specific integrated circuit (ASIC), Field-programmable gate arrays (FPGAs), etc. and any combination of these), a data storage system 706 (e.g., one or more non-volatile storage devices) and computer software 708 stored on the storage system 706. Configuration parameters 710 may also be stored in storage system 706. Base station 104 also includes transmit/receive (Tx/Rx) circuitry 704 for transmitting data to and receiving data from UE 102 and transmit/receive (Tx/Rx) circuitry 705 for transmitting data to and receiving data from, for example, network 105. Software 708 is configured such that when processor 702 executes software 708, base station 104 performs steps described above with reference to the flow chart shown in FIG. 5. In other embodiments, data processing system 702 is configured to perform steps described above with reference to the flow chart shown in FIG. 5 without the need for software 608. That is, for example, data processing system may consist merely of one or more ASICs.

While various embodiments of the present invention have been described above, it should be understood that they have been presented by way of example only, and not limitation. Thus, the breadth and scope of the present invention should not be limited by any of the above-described exemplary embodiments.

Additionally, while the processes described above and illustrated in the drawings are shown as a sequence of steps, this was done solely for the sake of illustration. Accordingly, it is contemplated that some steps may be added, some steps may be omitted, the order of the steps may be re-arranged, and some steps may be performed in parallel.

The invention claimed is:

1. A method, performed by a first network node, for communicating to a second network node priority information that can be used by the second network node to schedule the transmission of downlink application data to a user equipment (UE), comprising:
    (a) receiving, at the first network node via a network, a first packet transmitted from a device connected to the network, the first packet containing downlink application data (AD1) intended for the UE;
    (b) determining the priority of said downlink application data intended for the UE;
    (c) creating a second packet comprising a header and payload, the payload of the second packet comprising at least some of the downlink application data; and
    (d) transmitting, from the first network node, the second packet towards the second network node, wherein the step of creating the second packet comprises including in the header of the second packet priority information identifying the priority determined in step (b), and
the step of transmitting the second packet comprises transmitting the second packet towards the second network node with at least some of the downlink application data and the priority information.

2. The method of claim 1, further comprising:
creating a third packet comprising a header and payload, the payload of the third packet comprising the second packet, wherein
the third packet is an Internet Protocol packet and the header of the second packet is a user datagram protocol (UDP) or transmission control protocol (TCP) header that includes a port number field,
the step of including the priority information in the header of the second packet comprises placing at least some of the priority information in a port number field of the header of the second packet, and
the step of transmitting the second packet towards the second network node comprises transmitting the third packet towards the second network node.

3. The method of claim 1, wherein
the second packet is an Internet Protocol packet and the header includes a Differentiated Services (DS) field or Type of Service (TOS) field, and
the step of including the priority information in the header comprises placing at least some of the priority information in the DS or TOS field of the header.

4. The method of claim 1, further comprising:
creating a third packet comprising a header and payload, the payload of the third packet comprising the second packet, wherein
the third packet is an Internet Protocol packet and the header of the second packet is a tunneling protocol header that includes a tunnel endpoint identifier (TEID) field,
the step of including the priority information in the header of the second packet comprises placing at least some of the priority information in the TEID field of the header of the second packet, and
the step of transmitting the second packet towards the second network node comprises transmitting the third packet towards the second network node.

5. The method of claim 1, wherein
the first packet includes a header containing a destination address, and
the step of determining the priority of the downlink application data comprises determining the destination address included in the header of the first packet and using the destination address to obtain policy information that includes the priority information or information from which the priority information can be derived by transmitting to a policy server a request for the policy information, wherein the request includes the destination address.

6. The method of claim 1, wherein
the step of determining the priority of the downlink application data comprises determining the application executing in the UE that is the intended recipient of the application data contained in the first packet.

7. The method of claim 1, wherein
the step of determining the priority of the downlink application data comprises inspecting the payload of at least the first packet to determine the type of content contained in the payload.

8. The method of claim 1, wherein the first network node is an edge router or edge gateway and the second network node is a base station.

9. An apparatus, comprising
a data storage system storing computer software;
a data processing system for executing the computer software; and
a transmit and receive module operable to receive a first packet containing downlink application data destined for a user equipment (UE), wherein
the computer software is configured such that when the computer software is executed by the data processing system the data processing system, in response to receiving the first packet, performs a process comprising the following steps:
(a) determining the priority of the downlink application data;
(c) creating a second packet comprising a header and payload, the payload of the second packet comprising at least some of the downlink application data; and
(d) transmitting the second packet towards a network node, wherein
the step of creating the second packet comprises including in the header of the second packet priority information identifying the priority determined in step (a), and
the step of transmitting the second packet comprises transmitting the second packet towards the network node with at least some of the application data and the priority information.

10. The apparatus of claim 9, wherein the process further comprises:
creating a third packet comprising a header and payload, the payload of the third packet comprising the second packet, wherein
the third packet is an Internet Protocol packet and the header of the second packet is a user datagram protocol (UDP) or transmission control protocol (TCP) header that includes a port number field,
the step of including the priority information in the header of the second packet comprises placing at least some of the priority information in a port number field of the header of the second packet, and
the step of transmitting the second packet towards the network node comprises transmitting the third packet towards the network node.

11. The apparatus of claim 9, wherein
the second packet is an Internet Protocol packet and the header includes a Differentiated Services (DS) field or Type of Service (TOS) field, and
the step of including the priority information in the header comprises placing at least some of the priority information in the DS or TOS field of the header.

12. The apparatus of claim 9, further comprising:
creating a third packet comprising a header and payload, the payload of the third packet comprising the second packet, wherein
the third packet is an Internet Protocol packet and the header of the second packet is a tunneling protocol header that includes a tunnel endpoint identifier (TEID) field,
the step of including the priority information in the header of the second packet comprises placing at least some of the priority information in the TEID field of the header of the second packet, and
the step of transmitting the second packet towards the network node comprises transmitting the third packet towards the network node.

13. The apparatus of claim 9, wherein
the first packet includes a header containing a destination address, and
the step of determining the priority of the application data comprises using the destination address to obtain policy information that includes the priority information or information from which the priority information can be derived by transmitting to a policy server a request for the policy information, wherein the request includes the destination address.

14. The apparatus of claim 9, wherein
the step of determining the priority of the application data comprises determining the application executing in the UE that is the intended recipient of the downlink application data contained in the first packet.

15. The apparatus of claim 9, wherein
the step of determining the priority of the downlink application data comprises inspecting the payload of at least the first packet to determine the type of content contained in the payload.

16. A method, performed by a first network node, for communicating to a second network node priority information, comprising:
(a) receiving, at the first network node, a first packet comprising a header and payload, wherein the payload comprises downlink application data (AD1) intended for a particular user equipment (UE), and the header comprises priority information;
(b) after receiving the first packet, receiving from the particular UE uplink application data (AD2);
(c) after receiving the uplink application data, creating a second packet comprising a header and payload, wherein the payload of the second packet comprises at least some of the uplink application data; and
(d) transmitting the second packet towards the second network node, wherein
the step of creating the second packet comprises including in the header of the second packet said priority information that was included in the header of the first packet or bits derived from said priority information.

17. The method of claim 16, wherein
the second packet is an Internet Protocol (IP) packet and the header of the second packet includes a Differentiated Services (DS) field or Type of Service (TOS) field, and
the step of including in the header of the second packet said priority information or said bits derived from said priority information comprises placing said priority information or said bits in the DS or TOS field of the header of the second packet.

18. The method of claim 16, wherein
the first packet is an Internet Protocol (IP) packet and the header of the first packet includes a Differentiated Services (DS) field or Type of Service (TOS) field, and
at least some of said priority information is contained in the DS or TOS field.

19. The method of claim 16, wherein
the first packet is a UDP/IP or TCP/IP packet and the header of the first packet includes a port number field, and
at least some of said priority information is contained in the port number field.

20. The method of claim 16, wherein
the first packet is a tunneling protocol packet and the header of the first packet includes a tunnel end point identification (TEPI) field, and
at least some of said priority information is contained in the TEPI field.

21. The method of claim 16, wherein the first network node is a base station operable to communicate wirelessly with the UE and configured to schedule the transmission of the downlink application data to the UE based, at least in part, on said priority information included in the header of the first packet and to schedule the transmission of the downlink application data to the UE based, at least in part, on said priority information included in the header of the first packet and a predetermined policy and to schedule an uplink transmission from the UE based, at least in part, on said priority information.

22. The method of claim 16, wherein the step of creating the second packet comprises:
- determining whether the uplink application data is addressed to the same application end point that originated the downlink application data; and
- including in the header of the second packet said priority information that was included in the header of the first packet or bits derived from said priority information in response to determining that the uplink application data is addressed to the same application end point that originated the downlink application data.

23. A base station apparatus capable of communicating to a network node priority information that can be used by the network node to prioritize the transmission of a packet, comprising:
- a data storage system storing computer software;
- a data processing system for executing the computer software; and
- a transmit and receive module operable to receive a first packet comprising a header and payload, wherein the payload comprises downlink application data intended for a particular user equipment (UE), and the header comprises priority information, wherein the computer software is configured such that when the computer software is executed by the data processing system the data processing system, in response to receiving the first packet, performs a process comprising the following steps:
- (a) after receiving the first packet, receiving from the particular UE uplink application data;
- (b) after receiving the uplink application data, creating a second packet comprising a header and payload, wherein the payload of the second packet comprises at least some of the uplink application data; and
- (c) transmitting the second packet towards the network node, characterized in that the step of creating the second packet comprises including in the header of the second packet said priority information that was included in the header of the first packet or bits derived from said priority information.

24. The base station of claim 23, wherein
the second packet is an Internet Protocol packet and the header of the second packet includes a Differentiated Services (DS) field or Type of Service (TOS) field, and
the step of including in the header of the second packet said priority information or said bits derived from said priority information comprises placing said priority information or said bits in the DS or TOS field of the header of the second packet.

25. The base station of claim 23, wherein
the first packet is a UDP/IP or TCP/IP packet and the header of the first packet includes a port number field, and
at least some of said priority information is contained in the port number field.

26. The base station of claim 23, wherein
the first packet is a tunneling protocol packet and the header of the first packet includes a tunnel end point identification (TEPI) field, and
at least some of said priority information is contained in the TEPI field.

27. The base station of claim 23, wherein the base station is configured to schedule the transmission of the downlink application data to the UE based, at least in part, on said priority information included in the header of the first packet and to schedule an uplink transmission from the UE based, at least in part, on said priority information.

28. The base station of claim 23, wherein the step of creating the second packet comprises:
- determining whether the uplink application data is addressed to the same application end point that originated the downlink application data; and
- including in the header of the second packet said priority information that was included in the header of the first packet or bits derived from said priority information in response to determining that the uplink application data is addressed to the same application end point that originated the downlink application data.

* * * * *

UNITED STATES PATENT AND TRADEMARK OFFICE
CERTIFICATE OF CORRECTION

PATENT NO.        : 8,848,635 B2
APPLICATION NO.   : 13/320350
DATED             : September 30, 2014
INVENTOR(S)       : Arvidsson et al.

Page 1 of 1

It is certified that error appears in the above-identified patent and that said Letters Patent is hereby corrected as shown below:

On the title page, item (75), under "Inventors", in Column 1, Line 1, delete "Ake" and insert -- Åke --, therefor.

On the title page, item (75), under "Inventors", in Column 1, Line 2, delete "Vendelso" and insert -- Vendelsö --, therefor.

On the title page, item (56), References Cited under "OTHER PUBLICATIONS", in Column 1, insert -- Second Office Action issued on July 14, 2014 in corresponding Chinese Application No. 200980159457.4, 14 pages. --.

In the Specification

In Column 8, Line 39, delete "base station 102" and insert -- base station 104 --, therefor.

In the Claims

In Column 13, Line 18, in Claim 9, delete "(c)" and insert -- (b) --, therefor.

In Column 13, Line 21, in Claim 9, delete "(d)" and insert -- (c) --, therefor.

Signed and Sealed this
Twelfth Day of May, 2015

Michelle K. Lee
*Director of the United States Patent and Trademark Office*